Nov. 15, 1966     C. R. CANNON     3,285,765
CELLULOSE ACETATE REVERSE OSMOSIS DESALINATION MEMBRANES CAST
FROM NON-AQUEOUS SOLUTIONS AND A METHOD OF MAKING THE SAME
Filed Oct. 18, 1965
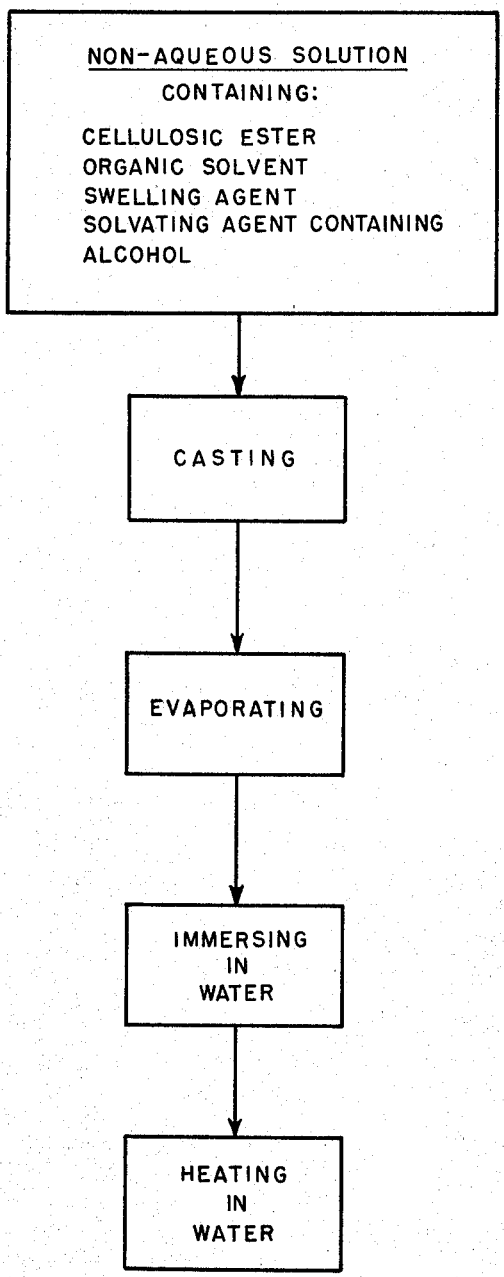
INVENTOR
CHARLES R. CANNON
BY Ernest S. Cohen
ATTORNEY

3,285,765
**CELLULOSE ACETATE REVERSE OSMOSIS DE-
SALINATION MEMBRANES CAST FROM NON-
AQUEOUS SOLUTIONS AND A METHOD OF
MAKING THE SAME**
Charles R. Cannon, Baldwin Park, Calif., assignor to the
United States of America as represented by the Secretary of the Interior
Filed Oct. 18, 1965, Ser. No. 497,566
7 Claims. (Cl. 106—187)

This invention relates to the demineralization of aqueous solutions for removing purified water and concentrating feed waters. In particular this invention relates to novel membranes produced by casting films from non-aqueous casting solutions, such as those comprising a cellulosic ester, an organic solvent, an alcohol, and a membrane swelling agent.

The reverse osmosis process for demineralization of aqueous solutions involves the use of a driving pressure in excess of the osmotic pressure to force purified water through a selective membrane which is capable of rejecting the dissolved solutes. The flow of water under the applied hydrostatic pressure is in a direction opposite to that normally observed in an osmotic experiment, in which the driving force is the solute concentration gradient between the opposite sides of the osmotic membrane.

Certain membranes, such as cellulosic esters, are selectively permeable to water, rejecting solutes. Although relatively high pressures of the order of 600 to 1,500 p.s.i. or higher are required for reverse osmosis of sea water, good salt rejection and reasonable flux rates have been obtained economically. The development of suitable membranes over recent years has progressed rapidly. Early reports of the reverse osmotic phenomenon by Reid et al. in J. Appl. Poly. Sci. vol. 1, page 133 (1959); vol. 2, page 264 (1959); and vol. 4, page 554 (1960) led workers in the field to seek development of better semipermeable osmotic films for high salt rejection and corresponding high throughput or permeation flux rate for water.

A significant advance in the desalination arts was made when Loeb et al. cast cellulose acetate membranes from a casting solution comprising a film-forming cellulosic ester and an aqueous solution of $Mg(ClO_4)_2$ in an organic solvent, such as acetone. The methods for membrane preparation and for their use in a reverse osmosis process for desalination are described in U. S. Patents 3,133,132 and 3,133,137, issued May 12, 1964. The Loeb membranes displayed a salt rejection of better than 10 gallons per square foot of membrane surface per day.

It has been discovered that cellulosic ester desalination membranes may be cast using solutions in which an alcohol, such as methanol, is substituted for water in the casting process. Good flux rates and salt rejection are obtained using the new membranes.

Accordingly, it is an object of this invention to provide new reverse osmosis desalination membranes cast from non-aqueous solutions. In particular, it is an object of this invention to provide a novel process for fabricating such membranes by dissolving a cellulosic ester, such as cellulose acetate, a swelling agent, and an alcohol, such as methanol, in an organic solvent, such as acetone, and casting this solution to form a uniformly-thick membrane. Further objects are to treat the cast membrane by immersion in a liquid to remove components from the cast membrane, and by heating the membrane in water to "anneal" the film. These and other objects and features of the invention will become apparent in the following description and the accompanying drawing wherein there is illustrated by way of a flow diagram a preferred embodiment of the invention. In that drawing a non-aqueous solution containing cellulosic ester, an organic solvent, a swelling agent, and a solvating agent containing alcohol is cast, evaporated, immersed in water and heated in water to form the product membrane.

In normal operation, the reverse osmosis desalination cell is maintained in continuous operation. The feed solution is introduced under pressure at the high pressure side of the cell and contacted with the membrane surface. The feed solution is circulated across the membrane surface so as to minimize the effects of boundary layer phenomena, and to decrease the solution concentration at the interface of the membrane. A portion of the concentrated feed solution is continuously withdrawn from the cell and may be discarded or utilized as a concentrate. Water passes through the selective osmotic membrane into the low pressure side of the cell and is withdrawn from the system, usually as the desired product. The thin membranes would normally rupture from the high pressure differential between the input and output sides of the cell were it not for the use of a porous backing between the membrane and the low-pressure side to provide a support for the thin film.

In the fabrication of reverse osmosis membranes according to the Loeb process, a typical casting solution contains 22.2 wt. percent cellulose acetate, 66.7% acetone solvent, 10.0% water, and 1.1% magnesium perchlorate swelling agent. The casting solution is cooled below −7.5° C. and rapidly spread with a doctor blade to a desired thickness of about 0.010 inch on a pre-cooled glass plate. The solvent is allowed to evaporate at about −11° C. for a few minutes and the film is immersed in cold water at about 1° to 5° C. to remove solvent from the membrane. The membrane is then heated in water for a period of time from a few seconds up to one-half hour at a temperature between about 77° and 90° C. The side away from the glass plate during the casting and evaporating steps is the "active" surface and is maintained in contact with the feed solution during water removal in the reverse osmosis cell.

The particular materials disclosed by Loeb et al. in Patents 3,133,132 and 3,133,137 are not the only ones suitable for use with the present invention. Successful cellulosic ester membranes have been prepared using other swelling agents than magnesium perchlorate, notably zinc chloride, and other organic solvents than acetone, e.g. dioxane, and these membranes have been reported by Keilin in "The Mechanism of Desalination by Reverse Osmosis," in Research and Development Progress Report No. 84 of the Office of Saline Water (PB 181571). The swelling agents used by the prior art workers during the film preparation may be used in this invention, as well as electrolytes containing magnesium, zinc, beryllium, perchlorate or halide ions, or combinations of these ions. Film thicknesses may vary considerably, but a finished thickness of 0.002 to 0.010 inch is preferred.

For purposes of comparison three examples of membranes prepared by the above-mentioned process are given.

*Example 1*

A casting solution containing 66.7 parts by weight acetone, 22.2 parts cellulose acetate, 10 parts water, and 5 parts zinc chloride was employed in the usual casting procedure. The cast membrane was formed by evaporating volatile solvents from the "active" membrane surface and immersing the partially-dried film in water to remove solvent and partially leach the film. The membrane was then heated in water to complete the post-treatment.

The above membrane was tested in a standard reverse osmosis cell by using a feed stream having an aqueous solution of sodium chloride containing 3.5 wt. percent NaCl at a feed pressure of 1500 p.s.i. The permeation rate of purified water passing through the membrane was 15.0 gallons per square foot of membrane surface per day (g.f.d.). Salt rejection for this membrane was 98.6%.

*Example 2*

Methanol was substituted for water on an equimolar basis as compared to Example 1. A casting solution containing 66.7 parts by weight acetone, 22.2 parts cellulose acetate, 17.7 parts methanol, and 1.1 parts magnesium perchlorate swelling agent was used. A procedure identical to that of Example 1 was followed. Using the same testing conditions a flux rate of 8.0 g.f.d. and salt rejection of 98.1% were obtained. These are acceptable values for current reverse osmosis membrane technology.

*Example 3*

A casting solution containing 66.7 parts by weight acetone, 22.2 parts of cellulose acetate, 17.7 parts ethylene glycol, and 3.0 parts zinc chloride swelling salt was used. The same procedure used in casting and treating the membranes in Examples 1 and 2 was employed. Under the standard test conditions in the reverse osmosis cell a flux rate of 16.8 g.f.d. and salt rejection of 75.7% were obtained.

While the role of the water in the casting solutions used by Loeb et al. is not entirely known, it is believed that the water solvates salt ions used as swelling agents for the polymer, and there is hydrogen bonding to hydroxyl groups in the cellulosic ester polymer. It has been postulated that water is not unique in this role, and that alcohols exhibit the same properties. Any alcohol may be used in the present invention, but is preferred to use those which are compatible with the casting composition system at the casting temperatures employed.

On an equimolar basis with water, alcohol may be substituted for the aqueous component in the Loeb casting solution in U.S. Patent 3,133,132, and the amount of alcohol may be varied widely within the inventive concept.

The solvating agent used in the casting compositions of this invention may be a single alcohol, mixture of alcohols, or mixture of an alcohol with other solvating agents.

An essential element of this invention is the discovery that non-aqueous casting solutions can contain a component that is leachable when immersed in a liquid following casting. Loeb refers to a "pore-forming" property of the casting solutions, but this term may not actually describe the true mechanism of reverse osmosis membranes. When used in this environment, the term "leachable component" merely means those compositions which effect desalination or dimineralization under normal reverse osmosis conditions. The component may comprise any non-aqueous material which has the properties recited. In the examples given an alcohol together with an electrolyte makes up the leachable component, but the inventive concept includes all non-aqueous material having the property of being leached by a liquid subsequent to casting.

While cellulose acetate has been the most common membrane material used by the prior art workers and is the preferred embodiment of this invention, the acetyl group may be substituted by a suitable acyl radical, such as formyl, propionyl, butyryl, etc. Also, the concept is not limited by the particular casting procedure or membrane compositions disclosed, the only limitations being that the membranes comprise cellulosic ester polymer and be of the type suitable for use in reverse osmosis processes. The invention has been illustrated by specific examples but there is no intent to limit the invention to the specific details so disclosed, except insofar as set out in the following claims.

What is claimed is:

1. A method for preparing a membrane suitable for use in reverse osmosis demineralization processes comprising
   casting a non-aqueous solution comprising cellulosic ester, organic solvent, swelling agent, and an alcohol,
   evaporating a portion of said organic solvent,
   immersing the cast material in water, to remove the organic solvent and the swelling agent, and
   heating the material in water.

2. A method for preparing reverse osmosis demineralization membranes comprising
   dissolving about 22.2 parts by weight of cellulose acetate, 17.7 parts of methanol, and 1.1 part of magnesium perchlorate in about 66.7 parts of acetone;
   casting the solution to form a membrane of substantially uniform thickness;
   evaporating a portion of the acetone to form an active layer;
   immersing the cast membrane in water to remove acetone and magnesium perchlorate; and
   heating the cast membrane in water.

3. In a method for preparing a membrane suitable for use in reverse osmosis demineralization processes the improvement comprising casting a thin film from a composition comprising a cellulosic ester, an organic solvent, a swelling agent and an alcohol.

4. The method of claim 3 wherein the cellulosic ester is cellulose acetate, the organic solvent is acetone and the alcohol is methanol.

5. The method of claim 4 wherein the swelling agent is magnesium perchlorate.

6. The method of claim 1 wherein the cellulosic ester is cellulose acetate, the organic solvent is acetone, the swelling agent is magnesium perchlorate and the alcohol is methanol.

7. A reverse osmosis membrane made by the process of claim 1.

References Cited by the Examiner
UNITED STATES PATENTS

| | | | |
|---|---|---|---|
| 3,129,159 | 4/1964 | Maier | 106—196 |

FOREIGN PATENTS 866,412  4/1961  Great Britain.

OTHER REFERENCES

U.S. Office of Saline Water: "The mechanism of desalination by reverse osmosis, and its relation to membrane structure." Research and Development Progress Report No. 143, June 1965, pp. 19–21.

U.S. Office of Saline Water: "The mechanism of desalination by reverse osmosis." By Aerojet-General. Research and Development Progress Report No. 117. (January 5, 1965), pp. 16–17 and Table 5.

References Cited by the Applicant
UNITED STATES PATENTS 3,133,132  5/1964  Loeb et al.

ALEXANDER H. BRODMERKEL, *Primary Examiner.*

L. H. GASTON, P. E. ANDERSON, *Assistant Examiners.*